US008967665B1

(12) United States Patent
Lin et al.

(10) Patent No.: US 8,967,665 B1
(45) Date of Patent: Mar. 3, 2015

(54) INFLATABLE CUSHION FOR A SIDE-IMPACT AIRBAG

(71) Applicant: GM Global Technology Operations LLC, Detroit, MI (US)

(72) Inventors: Chin-Hsu Lin, Troy, MI (US); Yi-Pen Cheng, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/162,154

(22) Filed: Jan. 23, 2014

(51) Int. Cl.
*B60R 21/16* (2006.01)
*B60R 21/231* (2011.01)
*B60R 21/00* (2006.01)

(52) U.S. Cl.
CPC . *B60R 21/23138* (2013.01); *B60R 2021/23146* (2013.01); *B60R 2021/0055* (2013.01)
USPC .................. 280/743.1; 280/730.1; 280/730.2; 280/743.2

(58) Field of Classification Search
USPC ...................... 280/730.1, 730.2, 743.1, 743.2
See application file for complete search history.

(56) References Cited

U.S. PATENT DOCUMENTS

| | | | | |
|---|---|---|---|---|
| 5,791,685 | A * | 8/1998 | Lachat et al. | 280/743.1 |
| 5,924,721 | A * | 7/1999 | Nakamura et al. | 280/730.2 |
| 7,198,288 | B2 | 4/2007 | Kim et al. | |
| 7,207,595 | B2 | 4/2007 | Kanto et al. | |
| 7,278,656 | B1 * | 10/2007 | Kalandek | 280/730.2 |
| 7,611,164 | B2 | 11/2009 | Kai et al. | |
| 7,798,523 | B2 | 9/2010 | Shigemura | |
| 8,246,076 | B2 | 8/2012 | Schmidt et al. | |
| 8,360,466 | B2 * | 1/2013 | Kino et al. | 280/730.2 |
| 8,579,322 | B2 | 11/2013 | Saimura et al. | |
| 8,616,579 | B2 * | 12/2013 | Suzuki et al. | 280/743.2 |
| 8,651,515 | B2 * | 2/2014 | Baba et al. | 280/730.2 |
| 2006/0022441 | A1 * | 2/2006 | Hayashi et al. | 280/730.2 |
| 2006/0131845 | A1 | 6/2006 | Belwafa et al. | |
| 2006/0131847 | A1 * | 6/2006 | Sato et al. | 280/730.2 |
| 2006/0170202 | A1 | 8/2006 | Block et al. | |
| 2007/0200327 | A1 * | 8/2007 | Kloss et al. | 280/740 |
| 2008/0228358 | A1 | 9/2008 | Wang et al. | |

FOREIGN PATENT DOCUMENTS

| | | | |
|---|---|---|---|
| EP | 1299270 | A2 | 4/2003 |
| GB | 2239437 | A | 3/1991 |
| JP | 6-211094 | A | 8/1994 |
| JP | 8-207689 | A | 8/1996 |
| WO | WO 02/04255 | A2 | 1/2002 |

* cited by examiner

*Primary Examiner* — Toan To

(57) ABSTRACT

An inflatable cushion for a side-impact airbag includes first and second fabric panels forming an expandable chamber. The first fabric panel forms a tubular shape upon inflation and includes a top end and a bottom end having continuous outer perimeters and an inflator aperture. The second fabric panel joined to the top end of the first fabric panel and having a circumference equal to a circumference of the continuous outer perimeter of the top end of the first fabric panel and including a vent aperture. The second fabric panel is orthogonal to a longitudinal axis of the first fabric panel when the inflatable cushion is inflated. The bottom end of the first fabric panel is closed. The longitudinal axis of the tubular-shaped first fabric panel is parallel to a longitudinal axis of a vehicle seat back when the inflatable cushion is deployed.

18 Claims, 11 Drawing Sheets

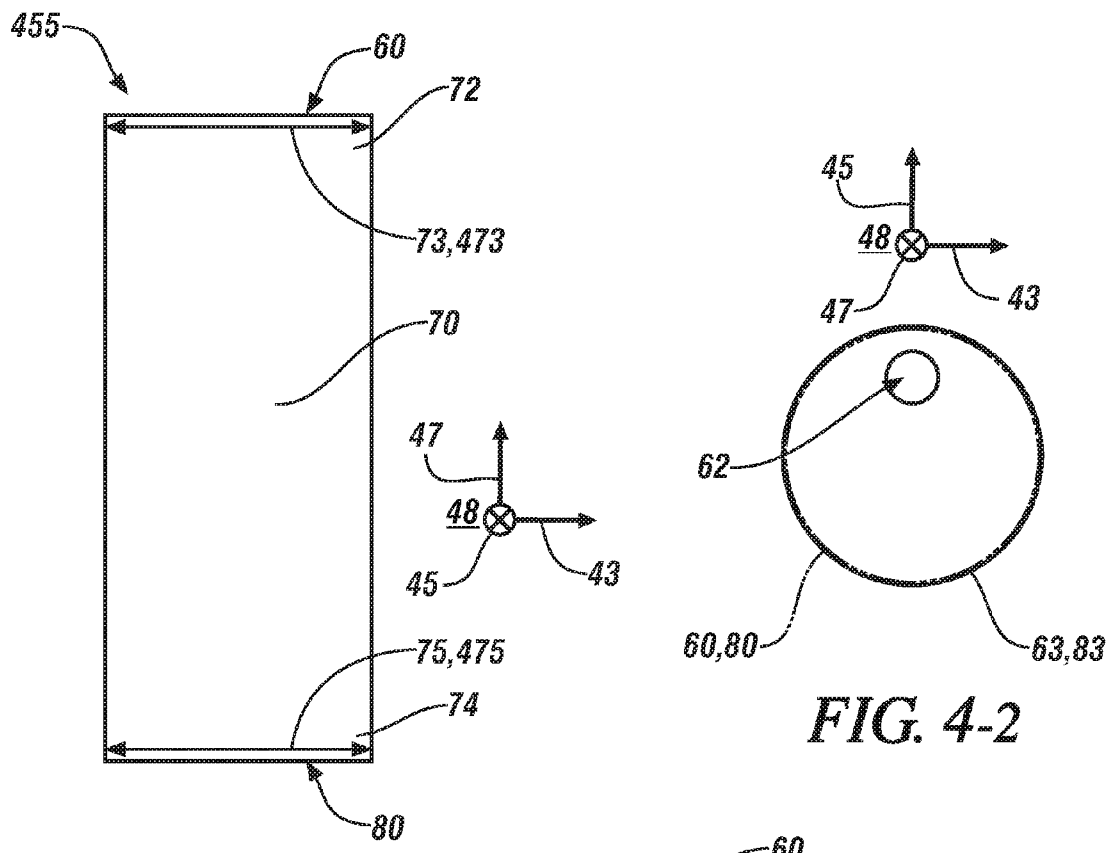
FIG. 4-1
FIG. 4-2
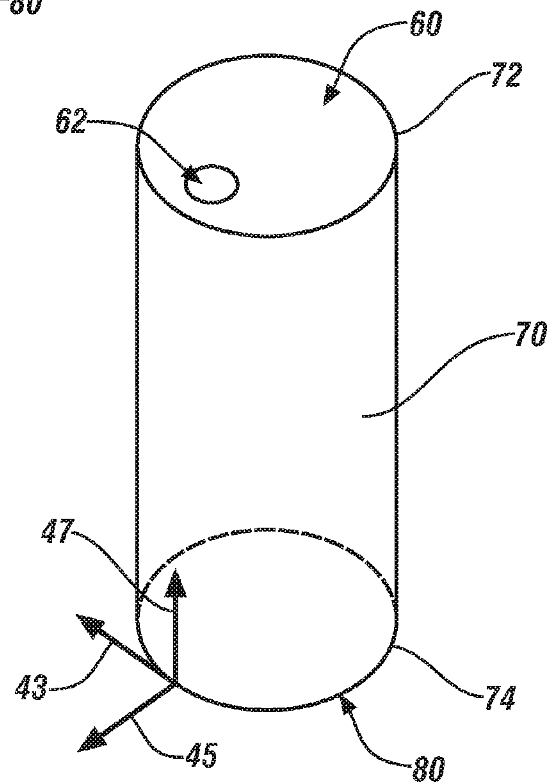
FIG. 4-3

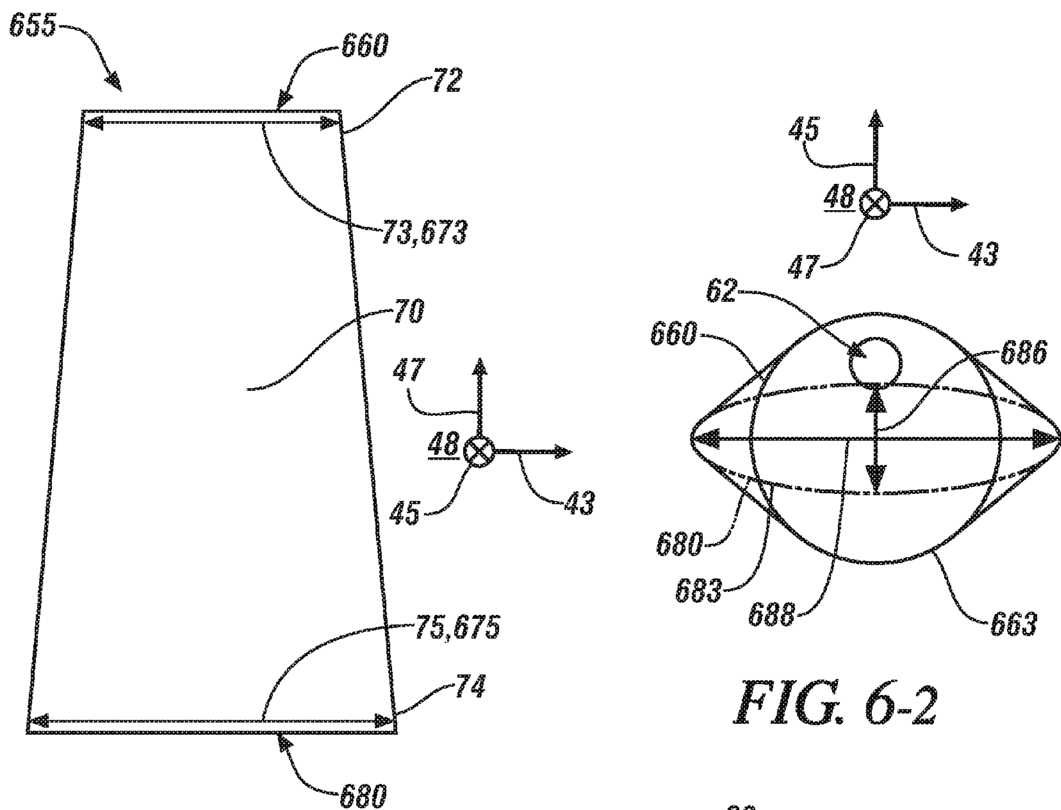
FIG. 6-1
FIG. 6-2
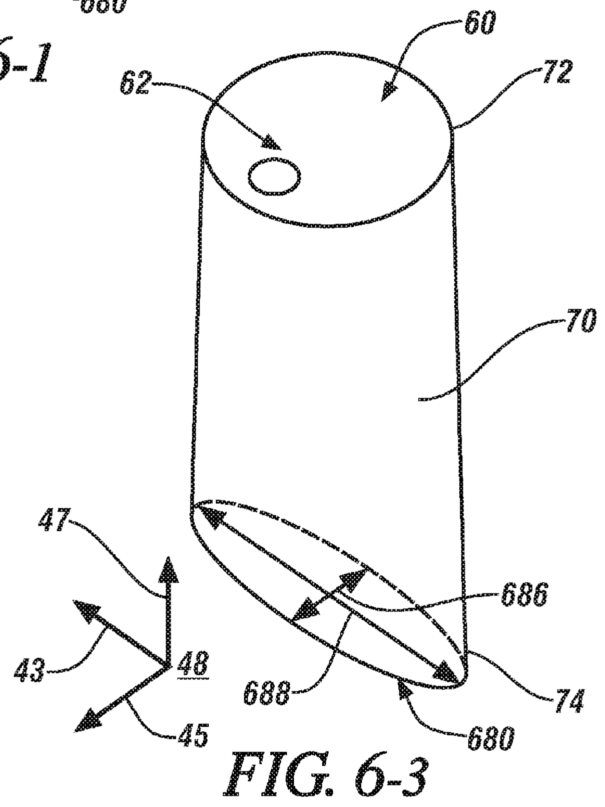
FIG. 6-3

70
47
43
48
45
74
886
880
888

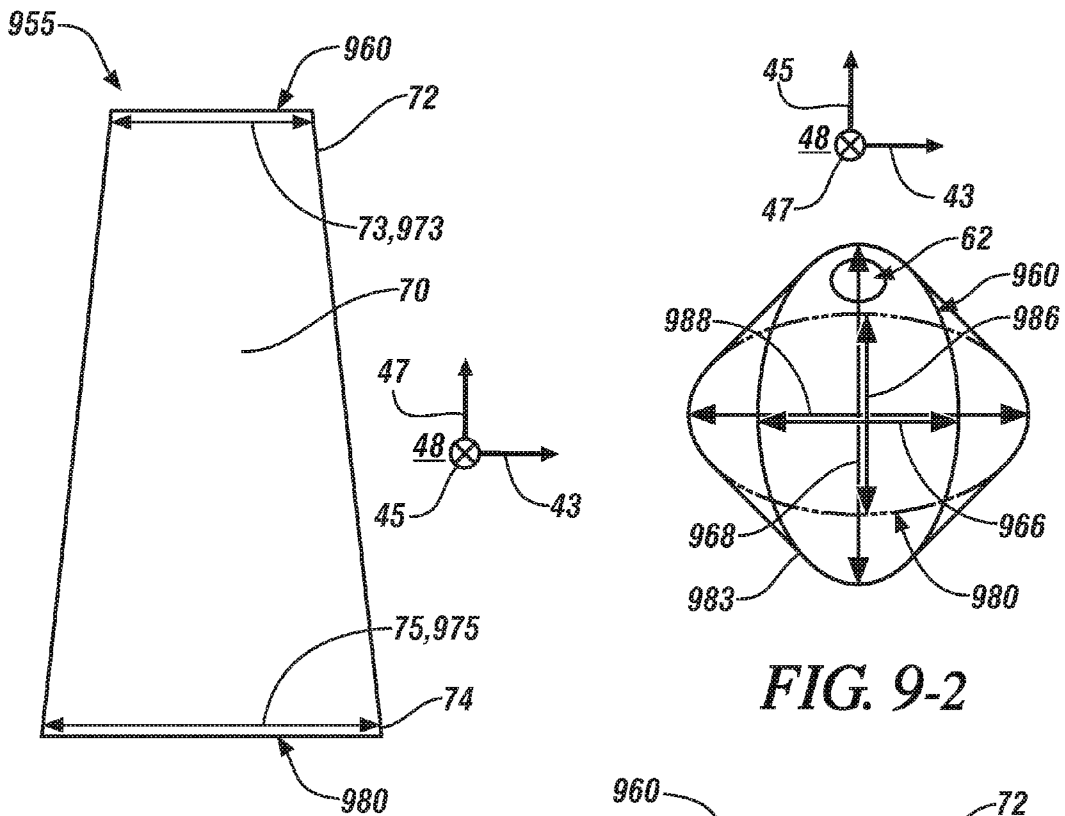
FIG. 9-1
FIG. 9-2
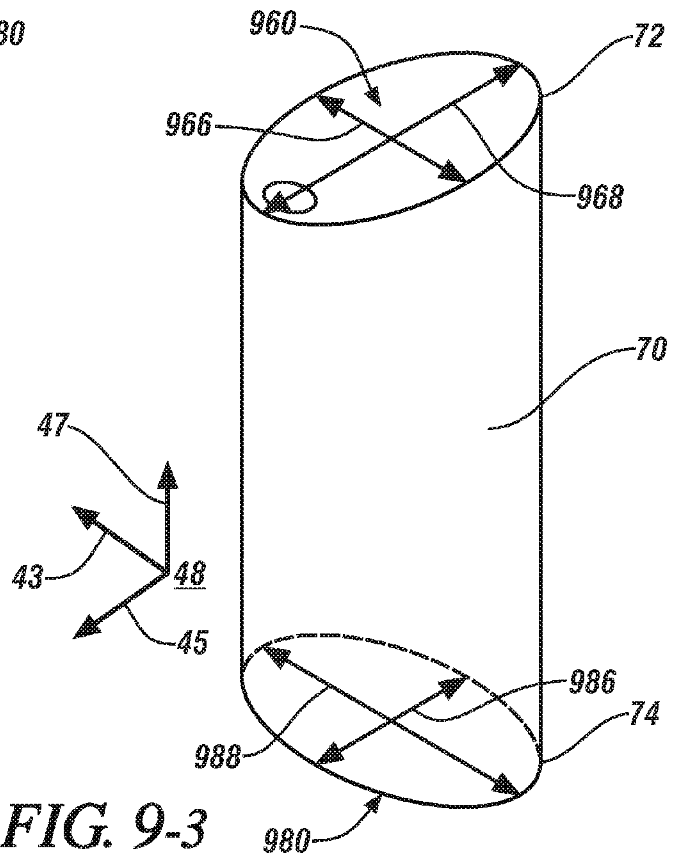
FIG. 9-3

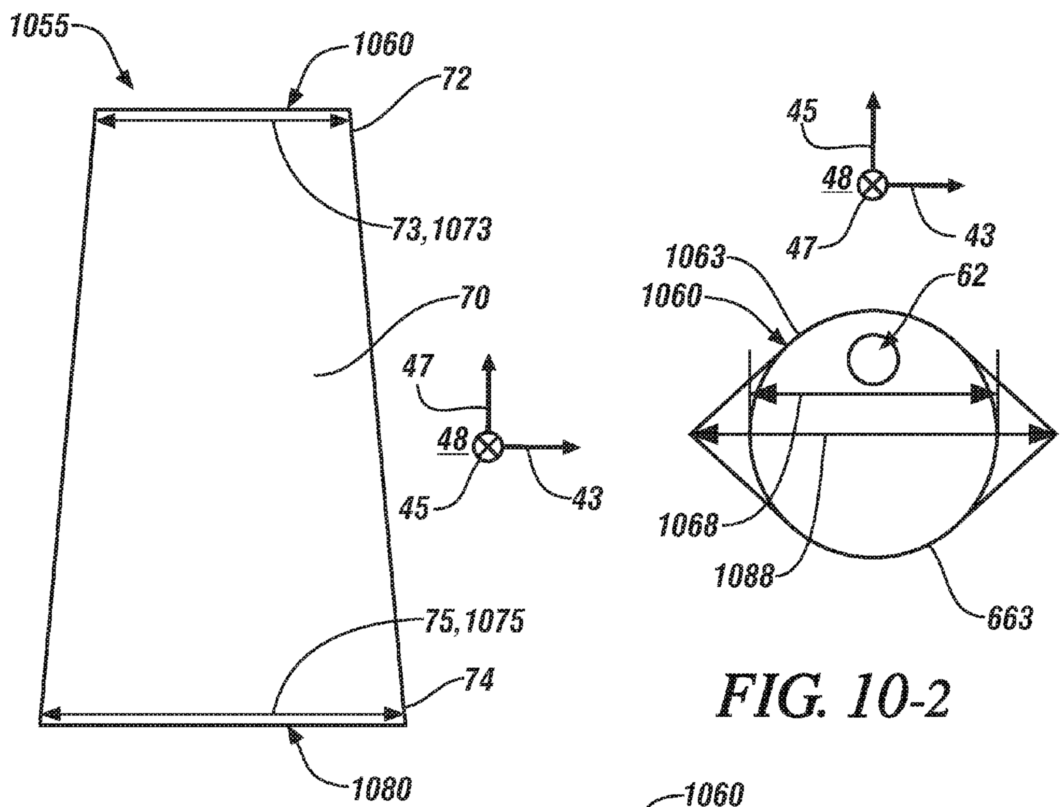
FIG. 10-1
FIG. 10-2
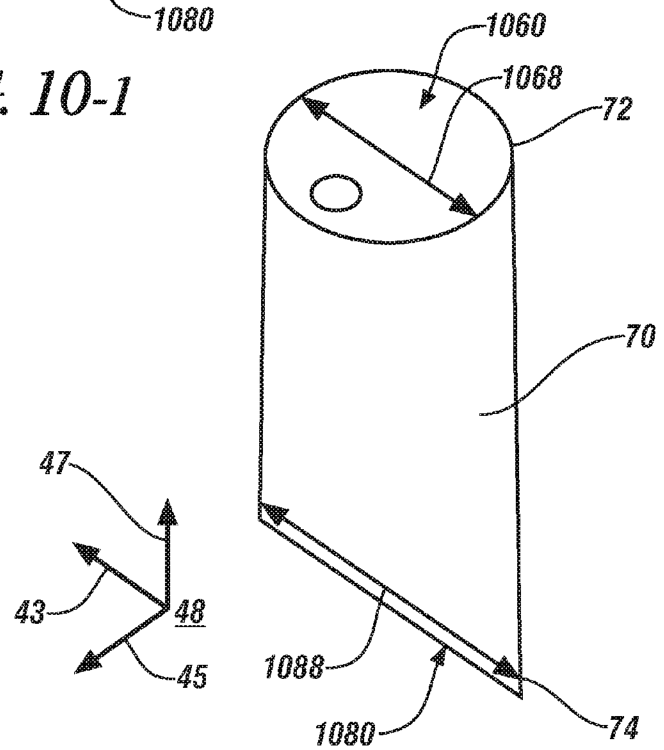
FIG. 10-3

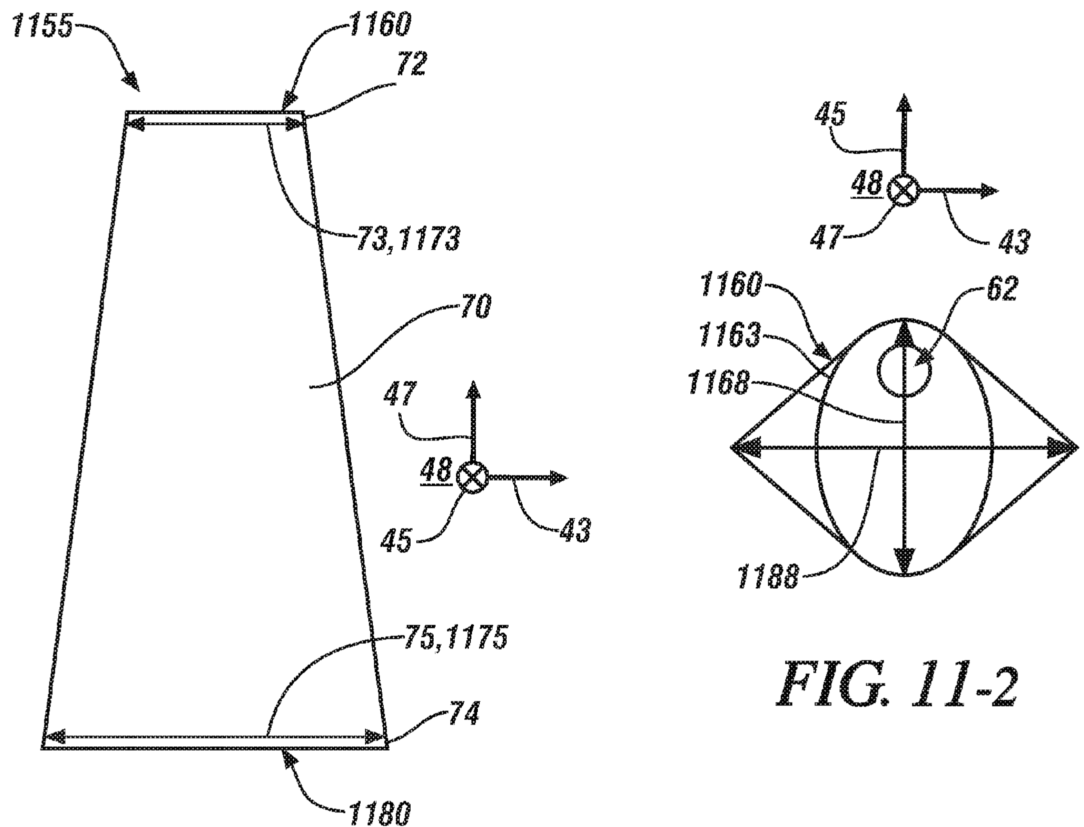
FIG. 11-1
FIG. 11-2
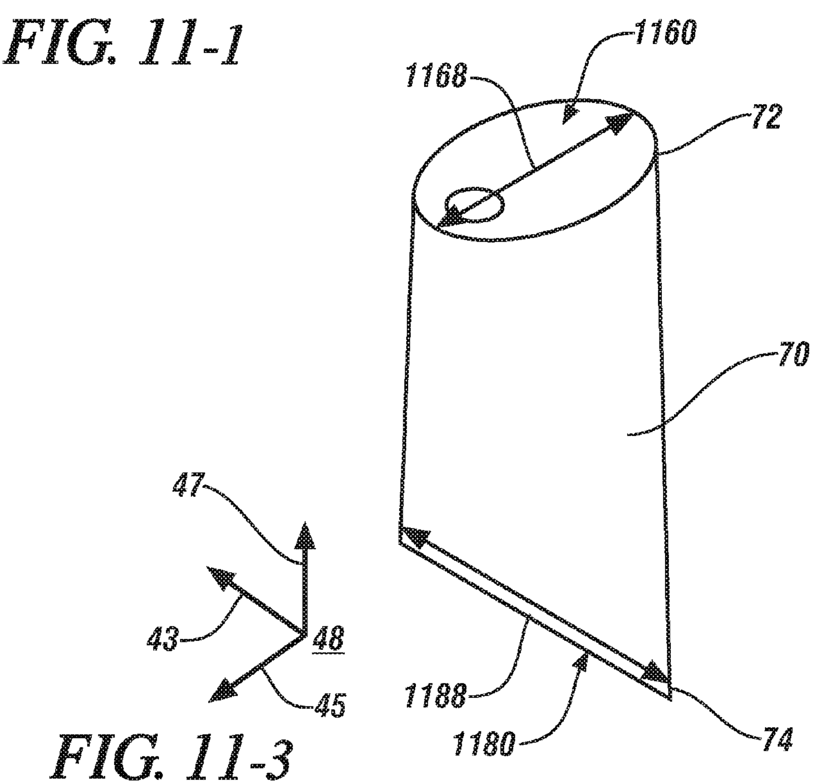
FIG. 11-3

INFLATABLE CUSHION FOR A SIDE-IMPACT AIRBAG

TECHNICAL FIELD

This disclosure is related to occupant restraint systems.

BACKGROUND

The statements in this section merely provide background information related to the present disclosure. Accordingly, such statements are not intended to constitute an admission of prior art.

Vehicles are equipped with airbag assemblies that include an inflatable airbag cushion providing supplemental occupant restraint in response to vehicle collisions. Known airbag assemblies can be located, for example, in a steering wheel hub, within an instrument panel recess, within a seat, within interior trims, and within door panels to protect occupants during an impact event.

Known airbag assemblies can include an inflatable airbag cushion and an inflator device in fluid communication with the inflatable cushion. In a driver-side airbag assembly, a base plate can support the inflator device at the interior of the steering wheel opposing the driver. An aperture to the airbag cushion is disposed adjacent to the inflator device with a perimeter portion of the aperture held between the base plate and a retainer to secure the uninflated airbag cushion to the inflator device. When the airbag assembly is located elsewhere in the vehicle, the inflator device can be held within a trough-like housing with the airbag cushion secured along the walls of the housing. In each location, the inflator device can inject pressurized inflation gas into the cushion upon activation to effect inflation of the airbag cushion.

SUMMARY

An inflatable cushion for a side-impact airbag includes first and second fabric panels forming an expandable chamber. The first fabric panel forms a tubular shape upon inflation and includes a top end and a bottom end having continuous outer perimeters and an inflator aperture. The second fabric panel joined to the top end of the first fabric panel and having a circumference equal to a circumference of the continuous outer perimeter of the top end of the first fabric panel and including a vent aperture. The second fabric panel is orthogonal to a longitudinal axis of the first fabric panel when the inflatable cushion is inflated. The bottom end of the first fabric panel is closed. The longitudinal axis of the tubular-shaped first fabric panel is parallel to a longitudinal axis of a vehicle seat back when the inflatable cushion is deployed.

BRIEF DESCRIPTION OF THE DRAWINGS

One or more embodiments will now be described, by way of example, with reference to the accompanying drawings, in which:

FIGS. 4-1, 4-2 and 4-3 illustrate side, top and isometric views, respectively, of an embodiment of an airbag cushion in an inflated state including circularly-shaped second and third fabric panels having common diameters, in accordance with the disclosure;

FIGS. 5-1, 5-2 and 5-3 illustrate side, top and isometric views, respectively, of an embodiment of an airbag cushion in an inflated state forming an inverted frustum having a decreasing diameter including circularly-shaped second and third fabric panels having different diameters, in accordance with the disclosure;

FIGS. 6-1, 6-2 and 6-3 illustrate side, top and isometric views, respectively, of an embodiment of an airbag cushion in an inflated state including a circularly-shaped second fabric panel and an elliptically-shaped third fabric panel, in accordance with the disclosure;

FIGS. 7-1, 7-2 and 7-3 illustrate side, top and isometric views, respectively, of an embodiment of an airbag cushion in an inflated state including elliptically-shaped second and third fabric panels oriented parallel to a longitudinal axis of a vehicle, in accordance with the disclosure;

FIGS. 8-1, 8-2 and 8-3 illustrate side, top and isometric views, respectively, of an embodiment of an airbag cushion in an inflated state including elliptically-shaped second and third fabric panels oriented perpendicular to a longitudinal axis of a vehicle, in accordance with the disclosure;

FIGS. 9-1, 9-2 and 9-3 illustrate side, top and isometric views, respectively, of an embodiment of an airbag cushion in an inflated state including an elliptically-shaped second fabric panel oriented perpendicular to a longitudinal axis of a vehicle and an elliptically-shaped third fabric panel oriented parallel to the longitudinal axis of the vehicle, in accordance with the disclosure;

FIGS. 10-1, 10-2 and 10-3 illustrate side, top and isometric views, respectively, of an embodiment of an airbag cushion in an inflated state including a circularly-shaped second fabric panel and a closed bottom section, in accordance with the disclosure; and FIGS. 11-1, 11-2 and 11-3 illustrate side, top and isometric views, respectively, of an embodiment of an airbag cushion in an inflated state including an elliptically-shaped second fabric panel oriented perpendicular to a longitudinal axis of a vehicle and a closed bottom section, in accordance with the disclosure.

DETAILED DESCRIPTION

Figure 1:
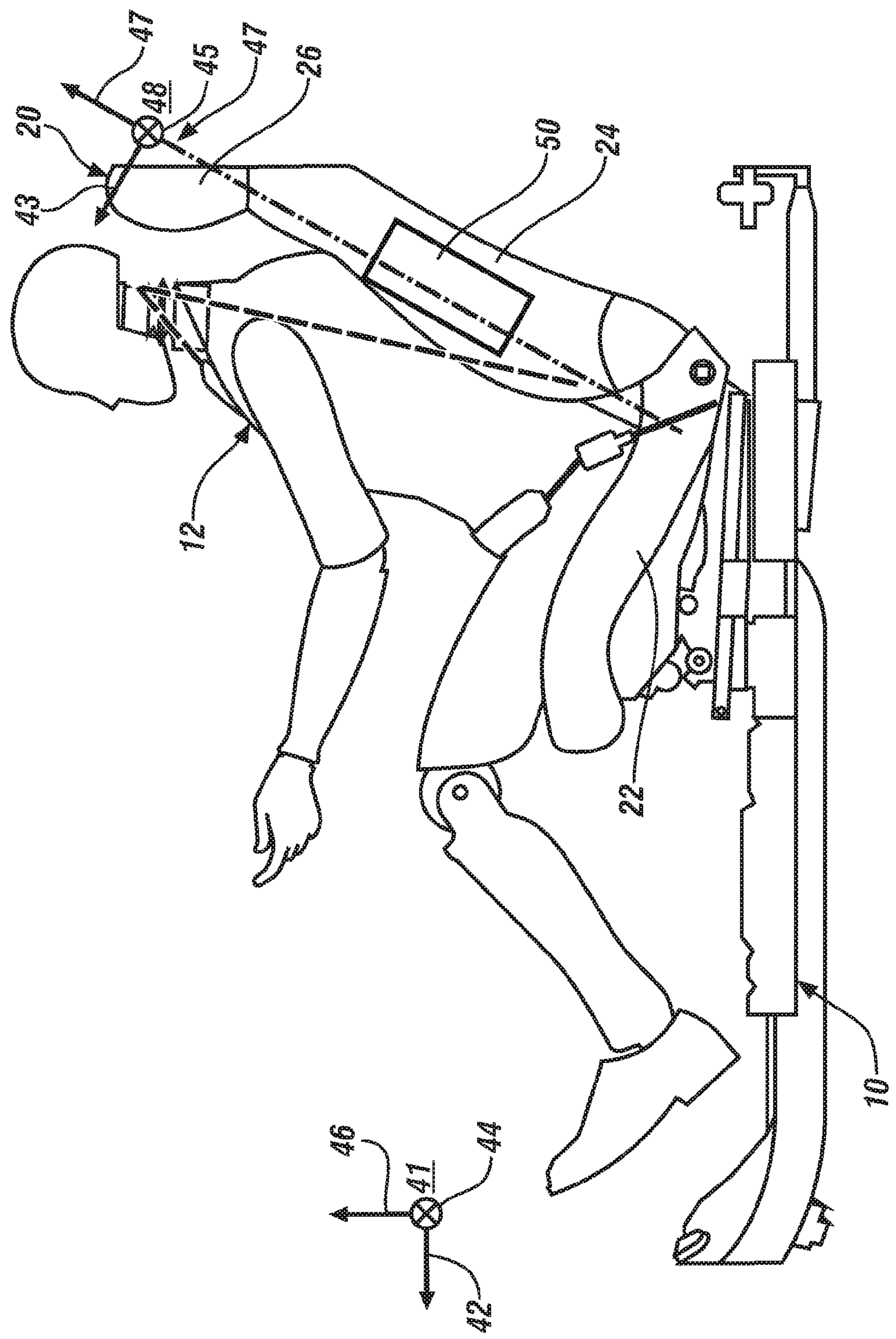
FIG. 1 illustrates a side view of a portion of a passenger compartment of a vehicle including an anthropomorphic test device (ATD) seated in a vehicle seat, in accordance with the disclosure.

Referring now to the drawings, wherein the showings are for the purpose of illustrating certain exemplary embodiments only and not for the purpose of limiting the same, FIG. 1 illustrates a side view of a portion of a passenger compartment of a vehicle 10 including an anthropomorphic test device (ATD) 12 seated in a seat 20. The ATD 12 is configured as an adult male ATD for purposes of illustration. The seat 20 is shown on a left side of the vehicle 10 in a front position, which is a driver's seat on a vehicle configured with left-hand drive. It is appreciated that the seat 20 can be in a front position, rear position or a middle position on the left side or the right side of the vehicle 10. The seat 20 includes a seat bottom 22, a seat back 24, and a headrest 26. An occupant restraint device in the form of an undeployed side-impact airbag 50 housed in the seat back 24 is depicted, and preferably includes a folded cushion having an air inlet in the form of an aperture secured to an inflator. The inflator injects pressurized gas through the aperture to inflate the cushion, thus providing a crush space between the occupant and the vehicle side to restrain and protect the occupant in the event of a side impact. The undeployed side-impact airbag 50 housed in the seat back 24 is illustrative. Alternatively, the undeployed side-impact airbag 50 may be housed in another suitable location in the vehicle passenger compartment that permits deployment of the side-impact airbag 50 into a space located between the illustrated ATD 12 and an adjacent inside portion of the vehicle 10, such as a door trim section or a B-pillar of a roof support. As such, the ATD 12 may be on the leftward side of an embodiment of the seat 20 when located on the left side of the vehicle or on the rightward side of an embodiment of the seat 20 when located on the right side of the vehicle. A first set of coordinate axes 41 is shown and includes an x-axis 42, y-axis 44 and z-axis 46, wherein the x-axis 42 is parallel with a longitudinal axis of the vehicle 10, the y-axis 44 is perpendicular with the x-axis in a horizontal plane and the z-axis 46 defines elevation orthogonal to the xy-plane. A second set of coordinate axes 48 is shown and includes an x'-axis 43, y'-axis 45 and z'-axis 47, wherein the z'-axis 47 is a second elevation axis that forms along the longitudinal extension of the seat back 24. The z'-axis 47 preferably also defines a longitudinal axis of the deployed airbag cushion 55. An x'y' plane is formed orthogonal to the z'-axis 47, with the y'-axis 45 parallel with the y-axis 44 and the x'-axis 43 extending in the longitudinal direction of the vehicle orthogonal to the y'z' plane. The second set of coordinate axes 48 including x'-axis 43, y'-axis 45 and z'-axis 47 provides common orientation for describing details of embodiments of the deployed airbag cushions throughout the several figures. Like numerals refer to like elements in the various embodiments shown herein.

Figure 2:
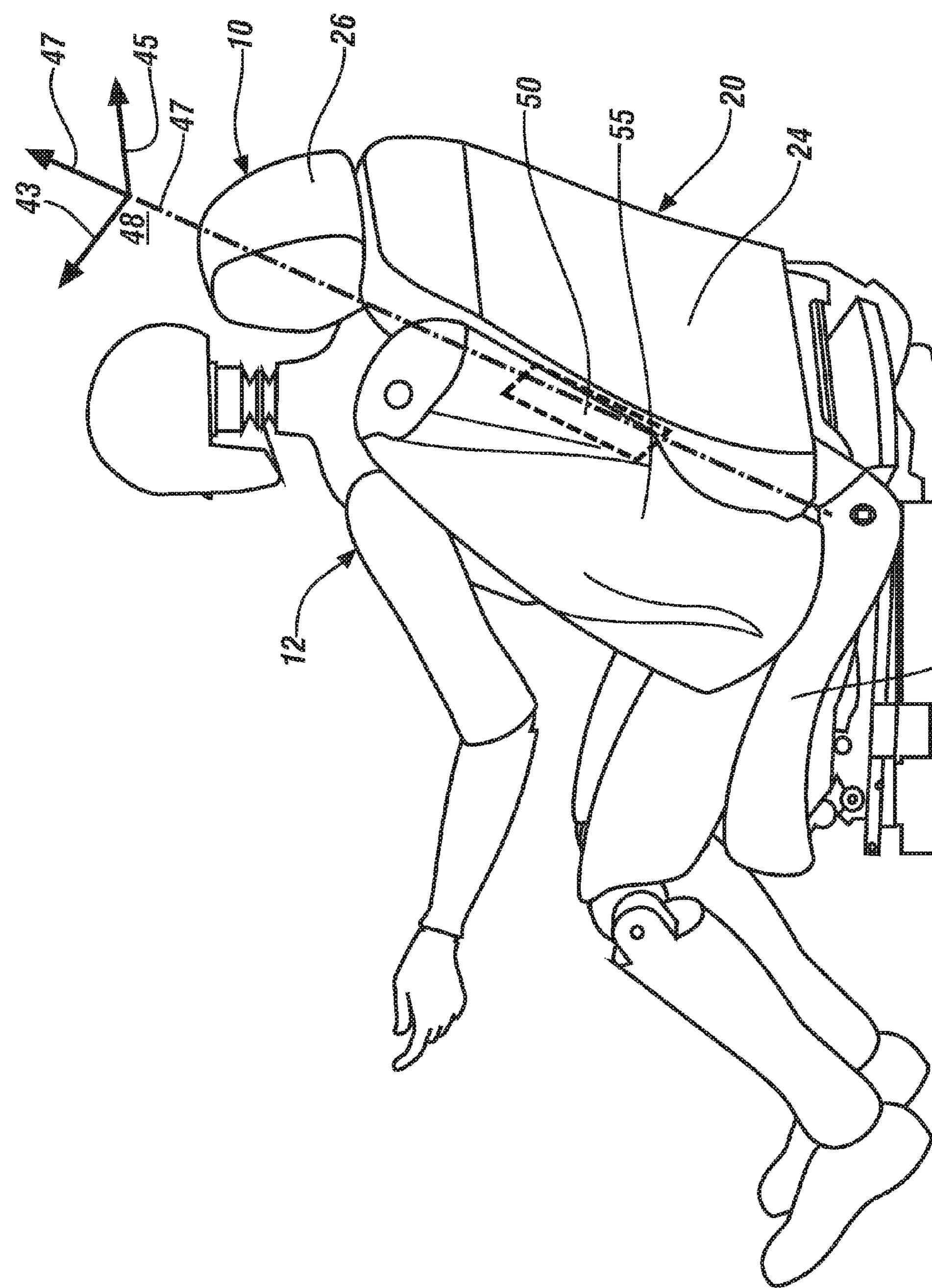
FIG. 2 illustrates an isometric view of a portion of a passenger compartment of a vehicle including an ATD seated in a vehicle seat and an inflated airbag cushion of a deployed side-impact airbag, in accordance with the disclosure.

FIG. 2 illustrates an isometric view of the portion of the occupant compartment of the vehicle 10 including the ATD 12 seated in the seat 20 including an inflated airbag cushion 55 of a deployed side-impact airbag 50. The seat 20 includes a seat bottom 22, a seat back 24 and a headrest 26. The side-impact airbag 50 includes the airbag cushion 55 inflated by an inflator mechanism. The inflated airbag cushion 55 deploys into a space between the illustrated ATD 12 and an adjacent interior surface on a side portion of the vehicle 10. The inflator mechanism generates pressurized gas that is directed to an interior chamber of the airbag cushion 55. The airbag cushion 55 preferably has a longitudinal axis that is parallel to the z'-axis 47 defined by the seat back 24 between the seat bottom 22 and the headrest 26. As such, the inflated airbag cushion 55 provides a cushioning effect to the illustrated ATD 12 in the pelvic region including an upper-most part of the leg, the abdominal region, lower, middle and upper rib cage and shoulder region when deployed. Unless otherwise noted, the airbag cushion 55 is described in the inflated state throughout the various embodiments included herein.

Figure 3:
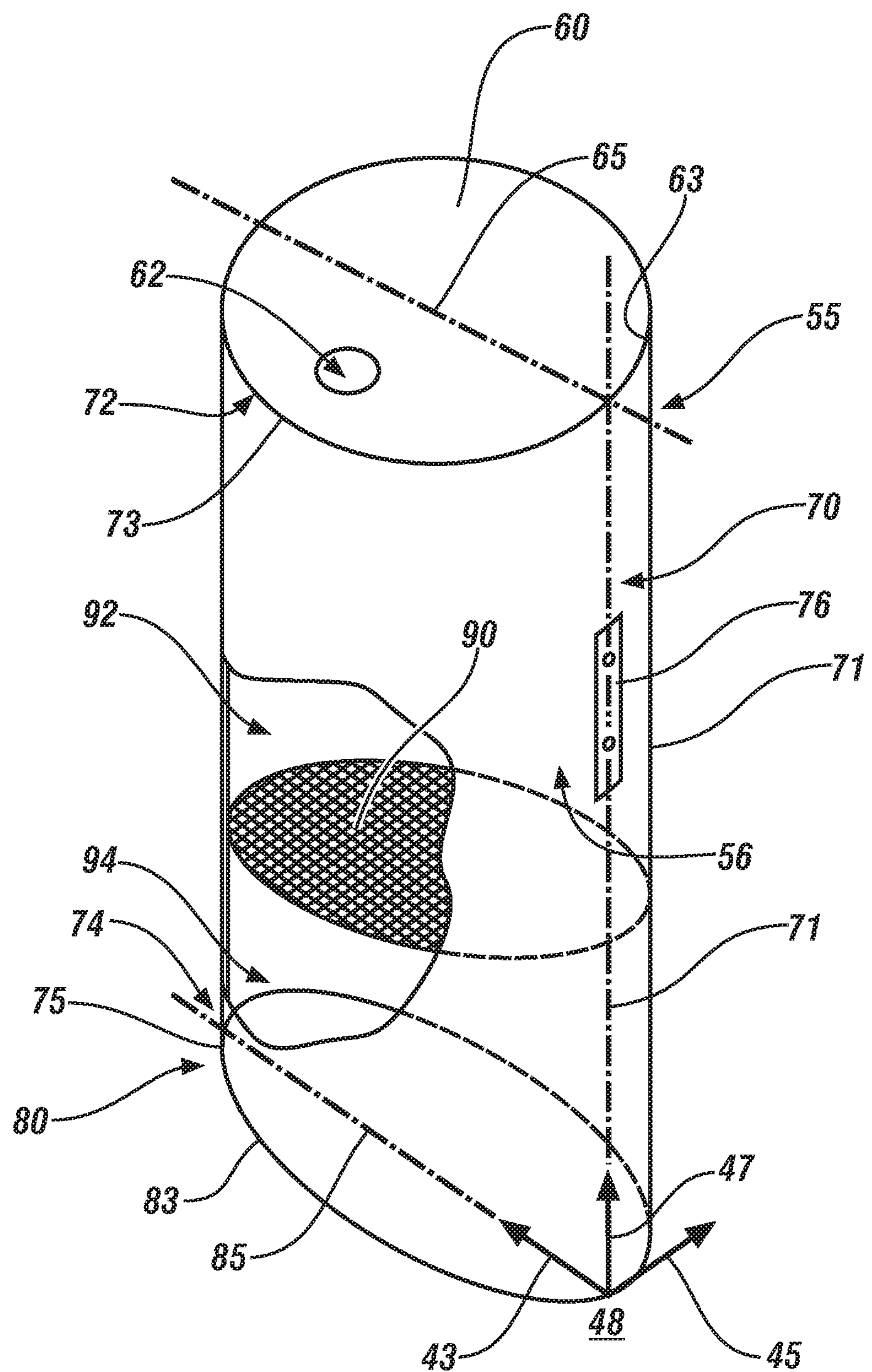
FIG. 3 illustrates an isometric view of an embodiment of an airbag cushion in an inflated state in context of a second set of coordinate axes, in accordance with the disclosure.
Figures 1, 5:
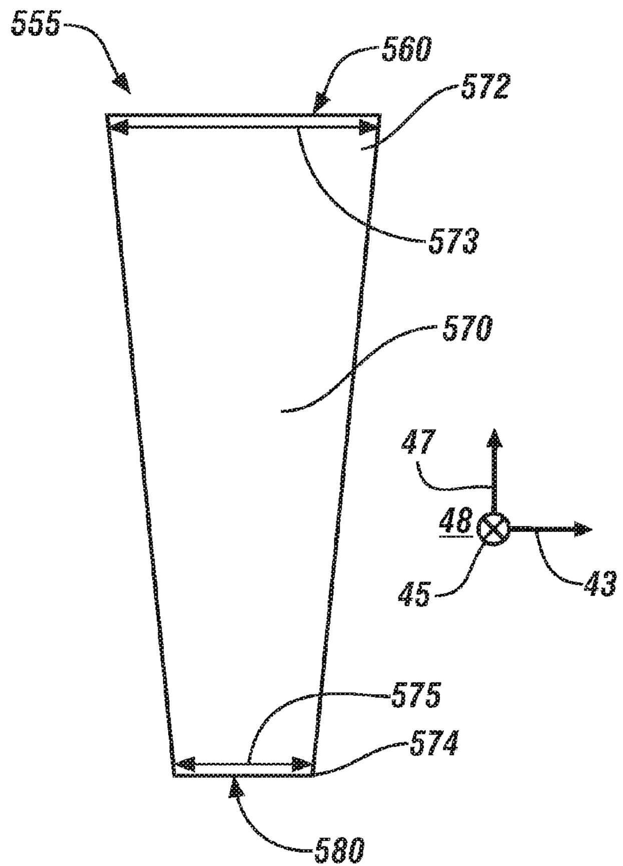
Figures 2, 5:
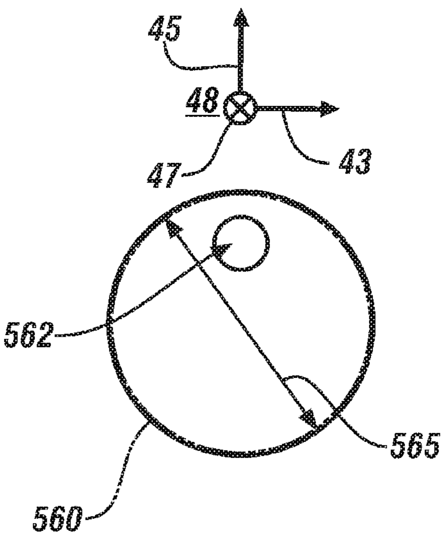
Figures 3, 5:
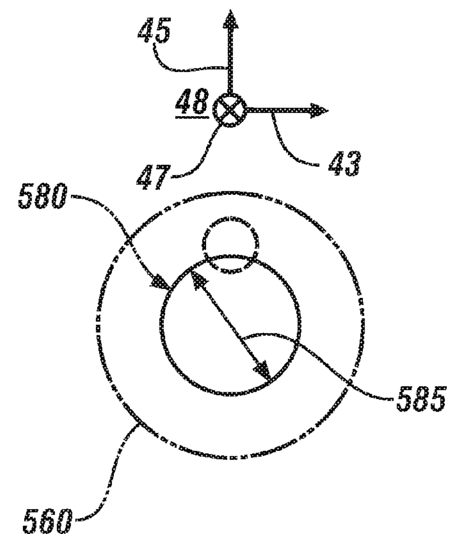
Figures 1, 7:
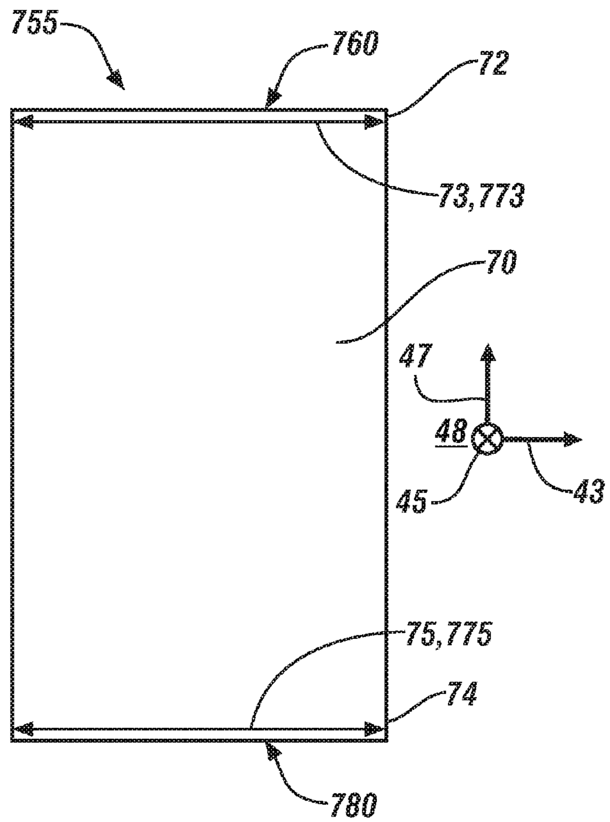
Figures 2, 7:
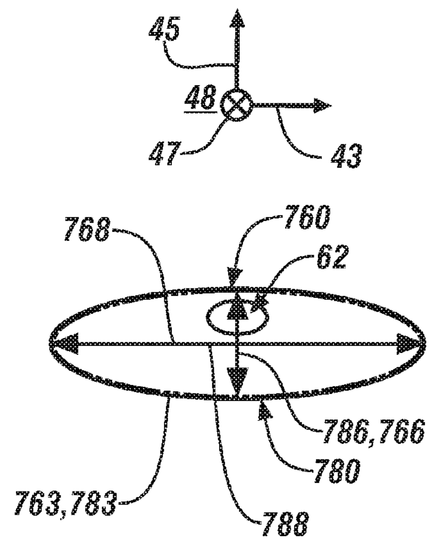
Figures 3, 7:
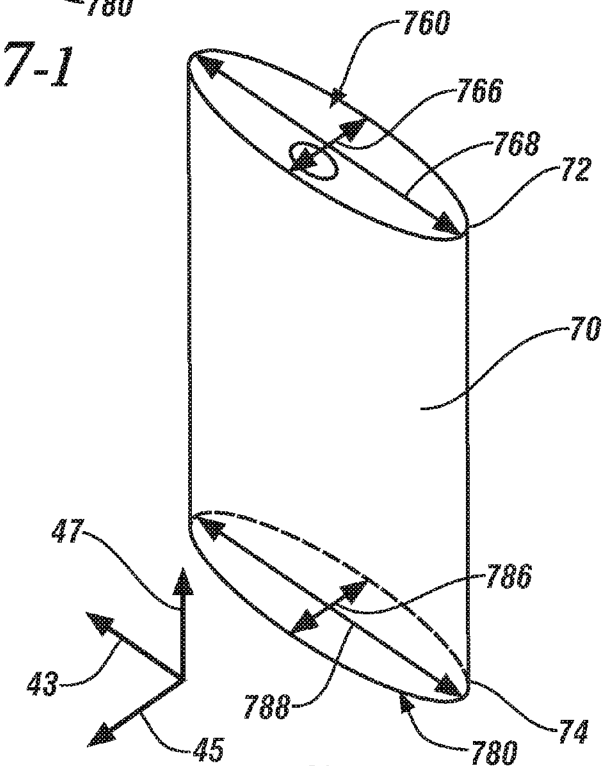
Figures 1, 8:
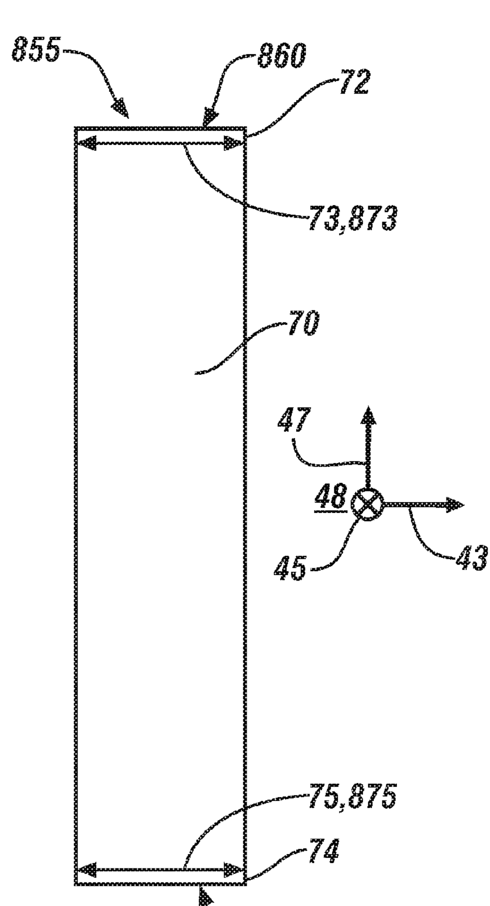
Figures 2, 8:
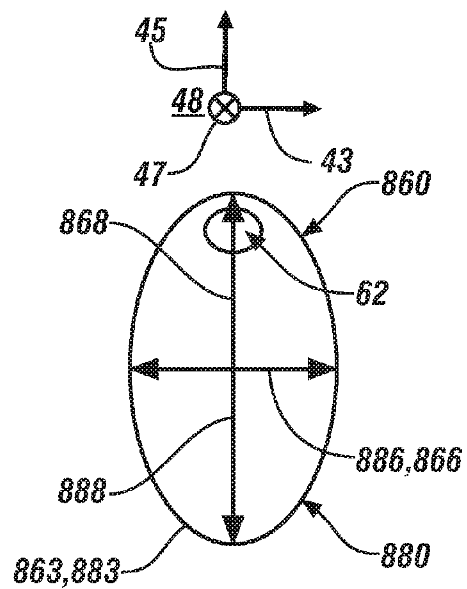
Figures 3, 8:
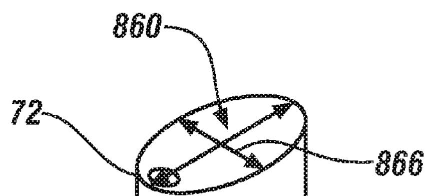

FIG. 3 illustrates an isometric view of an embodiment of the airbag cushion 55 in an inflated state in context of the second set of coordinate axes 48 including x'-axis 43, y'-axis 45 and z'-axis 47. The airbag cushion 55 is configured to deploy between an occupant of a vehicle seat and a side of the vehicle body in response to a side impact. The airbag cushion 55 includes an expandable device that is fabricated from a first fabric panel 70 and a second, upper fabric panel 60. A bottom end 74 of the first fabric panel 70 is sealably closed, either with a third, lower fabric panel 80 (as shown) or by joining along a seam, as shown in some embodiments. Fabric employed for the various fabric panels may be any suitable woven or other material developed for use in an expandable airbag cushion employed as an occupant restraint device. In one embodiment the airbag cushion 55 forms a single interior chamber 56 into which pressurized gas flows. The first fabric panel 70 is preferably formed into a shape that is tubular when inflated and includes a top end 72 and the bottom end 74 with longitudinal axis 71 that is parallel to the z'-axis 47 defined by the seat back 24. The first fabric panel 70 includes an inflator aperture 76 that is preferably a reinforced slit opening having an orientation that is parallel with the z'-axis 47 to insert an inflator into the single interior chamber 56 for flow of pressurized gas. The pressurized gas flows through the reinforced inflator aperture 76 into the interior chamber 56 to expand the airbag cushion 55 to effect its deployment. The top end 72 of the first fabric panel 70 has a continuous outer perimeter 73 on the top end 72 and a continuous outer perimeter 75 on the bottom end 74. The second fabric panel 60 has a continuous second perimeter 63 with a circumference that is equal to a circumference of the continuous outer perimeter 73 of the top end 72 of the first fabric panel 70. The second perimeter 63 of the second fabric panel 60 is joined to the outer perimeter 73 of the top end 72 of the first fabric panel 70 using any suitable form of joining, including, e.g., stitching, thermal fusing or adhesive bonding. The surface of the second fabric panel 60 is preferably perpendicular to the longitudinal axis 71 defined by the seat back 24 when the airbag cushion 55 is deployed in one embodiment. The second fabric panel 60 includes a vented aperture 62 to effect deflation of the deployed airbag cushion 55. The second fabric panel 60 includes diameter line 65 that is oriented parallel to the x' axis 43. The third fabric panel 80 has a continuous third perimeter 83 having a circumference equal to a circumference of the continuous outer perimeter 75 of the bottom end 74 of the first fabric panel 70. The third perimeter 83 of the third fabric panel 80 is joined to the outer perimeter 75 of the bottom end 74 of the first fabric panel 70 using any suitable form of joining, including, e.g., stitching, thermal fusing or adhesive bonding. The third fabric panel 80 includes diameter line 85 that is oriented parallel to the x' axis 43. The airbag cushion 55 may include an interior panel 90 preferably oriented parallel with the x'y' plane in one embodiment that is fabricated from fabric material that is permeable. Alternatively or in addition, the interior panel 90 includes a vent aperture. The interior panel 90 can be assembled into the first fabric panel 70 to separate the interior chamber 56 into an upper sub-chamber 92 and a lower sub-chamber 94.

Various embodiments of the airbag cushion 55 are described herein employing the first fabric panel 70, the second fabric panel 60 and in some embodiments, the third fabric panel 80. Each of the embodiments may include or alternatively may omit the interior panel 90. Related permutations within the scope of the claimed subject matter may be developed by those having ordinary skill in the art.

FIGS. 4-1, 4-2 and 4-3 schematically illustrate side, top and isometric views, respectively, of an embodiment of the airbag cushion 455 in an inflated state in context of the second set of coordinate axes 48 including x'-axis 43, y'-axis 45 and z'-axis 47. The side view shows the first fabric panel 70 with top end 72 and bottom end 74, wherein the outer perimeter 73 shown as outer diameter line 473 of the top end 72 is equal to the outer perimeter 75 shown as outer diameter line 475 of the bottom end 74. The top view shows the circularly-shaped second fabric panel 60 having second perimeter 63 that is equal to the outer perimeter 473 of the top end 72. The third fabric panel 80 is also circularly-shaped with a third perimeter 83 that is equal to the outer perimeter 475 of the bottom end 74 and equal to the outer perimeter 473 of the top end 72. The vent aperture 62 is also shown. The isometric view depicts the airbag cushion 555 in the inflated state in three dimensions.

FIGS. 5-1, 5-2 and 5-3 schematically illustrate side, top and bottom views, respectively, of an embodiment of the airbag cushion 555 in an inflated state in context of the second set of coordinate axes 48 including x'-axis 43, y'-axis 45 and z'-axis 47. The side view shows the first fabric panel 570 with top end 572 and bottom end 574 forming an inverted frustum having a decreasing diameter and correspondingly decreasing perimeter along the longitudinal axis from the top end 572 to the bottom end 574. The diameter 573 and corresponding outer perimeter of the top end 572 are greater than the diameter 575 and corresponding outer perimeter of the bottom end 574. The top view shows the circularly-shaped second fabric panel 560 having second diameter 565 and corresponding perimeter that is equal to the outer diameter 573 and corresponding perimeter of the top end 572. The vent aperture 562 is also shown. The bottom view shows the second fabric panel 560 and the third fabric panel 580 having second diameter 585 and corresponding perimeter that is equal to the diameter 575 and corresponding outer perimeter, respectively, of the bottom end 574 of the first fabric panel 570.

FIGS. 6-1, 6-2 and 6-3 schematically illustrate side, top and isometric views, respectively, of an embodiment of the airbag cushion 655 in an inflated state in context of the second set of coordinate axes 48 including x'-axis 43, y'-axis 45 and z'-axis 47. The side view shows the first fabric panel 70 with top end 72 and bottom end 74. The outer perimeter 73 shown as outer diameter line 673 of the top end 72 is equal to the outer perimeter 75 shown as outer diameter line 675 of the bottom end 74. The top view shows a circularly-shaped second fabric panel 660 having second perimeter 663 that is equal to the outer perimeter 673 of the top end 72. The third fabric panel 680 is elliptically-shaped with a third perimeter 683 that is equal to the outer perimeter 675 of the bottom end 74 and is preferably equal to the outer perimeter 673 of the top end 72. The elliptically-shaped third fabric panel 680 includes major axis 688 that is oriented parallel to the x'-axis 43 and an orthogonal minor axis 686. The orthogonal minor axis 686 has a length that is sized to permit the bottom end 74 of the airbag cushion 655 to create a crush space between the seat area of the occupant and the vehicle body when deployed. The vent aperture 62 is also shown. The isometric view depicts the airbag cushion 655 in the inflated state in three dimensions.

FIGS. 7-1, 7-2 and 7-3 schematically illustrate side, top and isometric views, respectively, of an embodiment of the airbag cushion 755 in an inflated state in context of the second set of coordinate axes 48 including x'-axis 43, y'-axis 45 and z'-axis 47. The side view shows the first fabric panel 70 with top end 72 and bottom end 74. The outer perimeter 73 shown as outer line 773 of the top end 72 is equal to the outer perimeter 75 shown as outer line 775 of the bottom end 74. The top view shows an elliptically-shaped second fabric panel 760 having second perimeter 763 that is equal to the outer perimeter 773 of the top end 72. The third fabric panel 780 is elliptically-shaped with a third perimeter 783 that is equal to the outer perimeter 775 of the bottom end 74 and is preferably equal to the outer perimeter 773 of the top end 72. The elliptically-shaped second fabric panel 760 includes major axis 768 that is oriented parallel to the x'-axis 43. The elliptically-shaped third fabric panel 780 includes major axis 788 that is oriented parallel to the x'-axis 43 and an orthogonal minor axis 786. The orthogonal minor axis 786 has a length that is sized to permit the bottom end 74 of the airbag cushion 755 to create a crush space between the seat area of the occupant and the vehicle body when deployed. The vent aperture 62 is also shown. The isometric view depicts the airbag cushion 755 in the inflated state in three dimensions.

FIGS. 8-1, 8-2 and 8-3 schematically illustrate side, top and isometric views, respectively, of an embodiment of the airbag cushion 855 in an inflated state in context of the second set of coordinate axes 48 including x'-axis 43, y'-axis 45 and z'-axis 47. The side view shows the first fabric panel 70 with top end 72 and bottom end 74. The outer perimeter 73 shown as outer line 873 of the top end 72 is equal to the outer perimeter 75 shown as outer line 875 of the bottom end 74. The top view shows an elliptically-shaped second fabric panel 860 having second perimeter 863 that is equal to the outer perimeter 873 of the top end 72. The third fabric panel 880 is elliptically-shaped with a third perimeter 883 that is equal to the outer perimeter 875 of the bottom end 74 and is preferably equal to the outer perimeter 873 of the top end 72. The elliptically-shaped second fabric panel 860 includes major axis 868 that is oriented parallel to the y'-axis 45. The elliptically-shaped third fabric panel 880 includes major axis 888 that is oriented parallel to the y'-axis 45 and an orthogonal minor axis 886. The major axis 888 has a length that is sized to permit the bottom end 74 of the airbag cushion 655 to create a crush space between the seat area of the occupant and the vehicle body when deployed. The vent aperture 62 is also shown. The isometric view depicts the airbag cushion 855 in the inflated state in three dimensions.

FIGS. 9-1, 9-2 and 9-3 schematically illustrate side, top and isometric views, respectively, of an embodiment of the airbag cushion 955 in an inflated state in context of the second set of coordinate axes 48 including x'-axis 43, y'-axis 45 and z'-axis 47. The side view shows the first fabric panel 70 with top end 72 and bottom end 74. The outer perimeter 73 shown as outer line 973 of the top end 72 is equal to the outer perimeter 75 shown as outer line 975 of the bottom end 74. The top view shows an elliptically-shaped second fabric panel 960 having second perimeter 963 that is equal to the outer perimeter 973 of the top end 72. The third fabric panel 980 is elliptically-shaped with a third perimeter 983 that is equal to the outer perimeter 975 of the bottom end 74 and is preferably equal to the outer perimeter 973 of the top end 72. The elliptically-shaped second fabric panel 960 includes major axis 968 that is oriented parallel to the y'-axis 45 and an orthogonal minor axis 966. The elliptically-shaped third fabric panel 980 includes major axis 988 that is oriented parallel to the x'-axis 43 and an orthogonal minor axis 986. The orthogonal minor axis 986 has a length that is sized to permit the bottom end 74 of the airbag cushion 955 to create a crush space between the seat area of the occupant and the vehicle body when deployed. The vent aperture 62 is also shown. The isometric view depicts the airbag cushion 955 in the inflated state in three dimensions.

FIGS. 10-1, 10-2 and 10-3 schematically illustrate side, top and isometric views, respectively, of an embodiment of the airbag cushion 1055 in an inflated state in context of the second set of coordinate axes 48 including x'-axis 43, y'-axis 45 and z'-axis 47. The side view shows the first fabric panel 70 with top end 72 and bottom end 74. The outer perimeter 73 shown as outer line 1073 of the top end 72 is equal to the outer perimeter 75 shown as outer line 1075 of the bottom end 74 in one embodiment. Alternatively, the outer perimeter 73 shown as outer line 1073 of the top end 72 is greater than the outer perimeter 75 shown as outer line 1075 of the bottom end 74 in one embodiment. The top view shows a circularly-shaped second fabric panel 1060 having second perimeter 1063 that is equal to the outer perimeter 1073 of the top end 72. The bottom end 74 is closedly joined along a seam 1080, with such joining including, e.g., stitching, thermal fusing or adhesive bonding. The circularly-shaped second fabric panel 1060 includes major axis 1068. The bottom end 74 includes major axis 1088 that is oriented parallel to the x'-axis 43. The vent aperture 62 is also shown. The isometric view depicts the airbag cushion 1055 in the inflated state in three dimensions.

FIGS. 11-1, 11-2 and 11-3 schematically illustrate side, top and isometric views, respectively, of an embodiment of the airbag cushion 1155 in an inflated state in context of the second set of coordinate axes 48 including x'-axis 43, y'-axis 45 and z'-axis 47. The side view shows the first fabric panel 70 with top end 72 and bottom end 74. The outer perimeter 73 shown as outer line 1173 of the top end 72 is equal to the outer perimeter 75 shown as outer line 1175 of the bottom end 74 in one embodiment. Alternatively, the outer perimeter 73 shown as outer line 1173 of the top end 72 is greater than the outer perimeter 75 shown as outer line 1175 of the bottom end 74 in one embodiment. The top view shows an elliptically-shaped second fabric panel 1160 having second perimeter 1163 that is equal to the outer perimeter 1173 of the top end 72. The bottom end 74 is closedly joined along a seam 1180, with such joining including, e.g., stitching, thermal fusing or adhesive bonding. The elliptically-shaped second fabric panel 1160 includes major axis 1168 that is oriented parallel to the y'-axis 45. The bottom end 74 includes major axis 1188 that is oriented parallel to the x'-axis 43. The vent aperture 62 is also shown. The isometric view depicts the airbag cushion 1155 in the inflated state in three dimensions.

In one embodiment the airbag cushion forms a single interior chamber 56 into which pressurized gas flows. The first fabric panel 70 is preferably formed into a shape that is tubular when inflated and includes a top end 72 and a bottom end 74 with a longitudinal axis 71 that is parallel to the z'-axis 47 defined by the seat back 24. The first fabric panel 70 includes an inflator aperture 76 that is preferably a slit opening that is fabricated in the first fabric panel 70, has an orientation that is parallel with the z'-axis 47, and provides a passageway that permits flow of pressurized gas to the single interior chamber 56. The pressurized gas flows through the reinforced inflator aperture 76 into the interior chamber 56 to expand the airbag cushion 55 to effect its deployment. The top end 72 of the first fabric panel 70 has a continuous outer perimeter 73 on the top end 72 and a continuous outer perimeter 75 on the bottom end 74. The second fabric panel 60 has a continuous second perimeter 63 with a circumference that is equal to a circumference of the continuous outer perimeter 73 of the top end 72 of the first fabric panel 70. The second perimeter 63 of the second fabric panel 60 is joined to the outer perimeter 73 of the top end 72 of the first fabric panel 70 using any suitable form of joining, including, e.g., stitching, thermal fusing or adhesive bonding. The second fabric panel 60 is preferably substantially parallel to the horizontal xy-plane of the vehicle when the airbag cushion 55 is deployed in one embodiment. The second fabric panel 60 includes a vented aperture 62 to effect deflation of the deployed airbag cushion 55.

The circular or elliptical second fabric panel alone or in combination with circular or elliptical second fabric panel can thus be configured to provide a crush space in a limited space between an occupant's pelvic area and a vehicle's side structure. The crush space can be tuned for torso and pelvic regions and optimized for specific vehicle architectures. Such a configuration maximizes cushion space between an occupant and the surrounding environment to absorb side-impact energy when the airbag cushion is deployed.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. An inflatable cushion for a side-impact airbag, comprising:
- first and second fabric panels forming an expandable chamber;
- the first fabric panel forming a tubular shape and including a top end and a bottom end having continuous outer perimeters upon inflation of the cushion;
- the second fabric panel joined to the top end of the first fabric panel and having a circumference equal to a circumference of the continuous outer perimeter of the top end of the first fabric panel and including a vent aperture;
- the second fabric panel orthogonal to a longitudinal axis of the first fabric panel upon inflation of the cushion;
- the bottom end of the first fabric panel closed; and
- the longitudinal axis of the first fabric panel parallel to a longitudinal axis of a vehicle seat back when the inflatable cushion is deployed.

2. The inflatable cushion of claim 1, wherein the second fabric panel is configured in a circular shape.

3. The inflatable cushion of claim 1, wherein the second fabric panel is configured in an elliptical shape.

4. The inflatable cushion of claim 3, wherein the elliptically shaped second fabric panel has a longitudinal axis that is parallel to a longitudinal axis of the vehicle.

5. The inflatable cushion of claim 1, wherein the tubular shape of the first fabric panel comprises a constant diameter along the longitudinal axis of the first fabric panel.

6. The inflatable cushion of claim 1, wherein the tubular shape of the first fabric panel comprises an inverted frustum having a decreasing diameter along the longitudinal axis of the first fabric panel.

7. The inflatable cushion of claim 1, further comprising:
- an interior fabric panel joined to the first fabric panel orthogonal to the longitudinal axis of the first fabric panel when the inflatable cushion is inflated;
- the interior fabric panel including a vent aperture; and
- the interior fabric panel separating the expandable chamber into an upper sub-chamber and a lower sub-chamber.

8. The inflatable cushion of claim 1, wherein the inflatable cushion for the side-impact airbag is deployable from the vehicle seat back.

9. The inflatable cushion of claim 1, wherein the first fabric panel further comprises an inflator aperture.

10. An inflatable cushion for an occupant restraint device deployable from a vehicle seat back and a side portion of a vehicle body, comprising:
- first, second and third fabric panels forming an expandable chamber;
- the first fabric panel inflatable into a tubular shape including a top end and a bottom end having continuous outer perimeters, and an inflator aperture;
- the second fabric panel joined to the top end of the first fabric panel and having a circumference equal to a circumference of the continuous outer perimeter of the top end of the first fabric panel and including a vent aperture;
- the third fabric panel joined to the bottom end of the first fabric panel and having a circumference equal to a circumference of the continuous outer perimeter of the bottom end of the first fabric panel;
- the second and third fabric panels orthogonal to a longitudinal axis of the first fabric panel when the inflatable cushion is inflated; and the longitudinal axis of the first fabric panel parallel to a longitudinal axis of the vehicle seat back when the inflatable cushion is deployed.

11. The inflatable cushion of claim 10, wherein the second fabric panel is configured in a circular shape and the third fabric panel is configured in a circular shape.

12. The inflatable cushion of claim 10, wherein the second fabric panel is configured in a circular shape and the third fabric panel is configured in an elliptical shape.

13. The inflatable cushion of claim 12, wherein the elliptically-shaped third fabric panel has a longitudinal axis that is parallel to a longitudinal axis of the vehicle.

14. The inflatable cushion of claim 10, wherein the second fabric panel is configured in an elliptical shape and the third fabric panel is configured in an elliptical shape.

15. The inflatable cushion of claim 14, wherein the elliptically-shaped second fabric panel has a longitudinal axis that is perpendicular to a longitudinal axis of the vehicle and the elliptically-shaped third fabric panel has a longitudinal axis that is parallel to a longitudinal axis of the vehicle.

16. The inflatable cushion of claim 10, wherein the tubular shape of the first fabric panel comprises a constant diameter along the longitudinal axis of the first fabric panel.

17. The inflatable cushion of claim 10, wherein the tubular shape of the first fabric panel comprises an inverted frustum having a decreasing diameter along the longitudinal axis of the first fabric panel.

18. The inflatable cushion of claim 10, further comprising:

an interior fabric panel joined to the first fabric panel orthogonal to the longitudinal axis of the first fabric panel when the inflatable cushion is inflated;

the interior fabric panel permeable; and the interior fabric panel separating the expandable chamber into an upper sub-chamber and a lower sub-chamber.

* * * * *